UNITED STATES PATENT OFFICE.

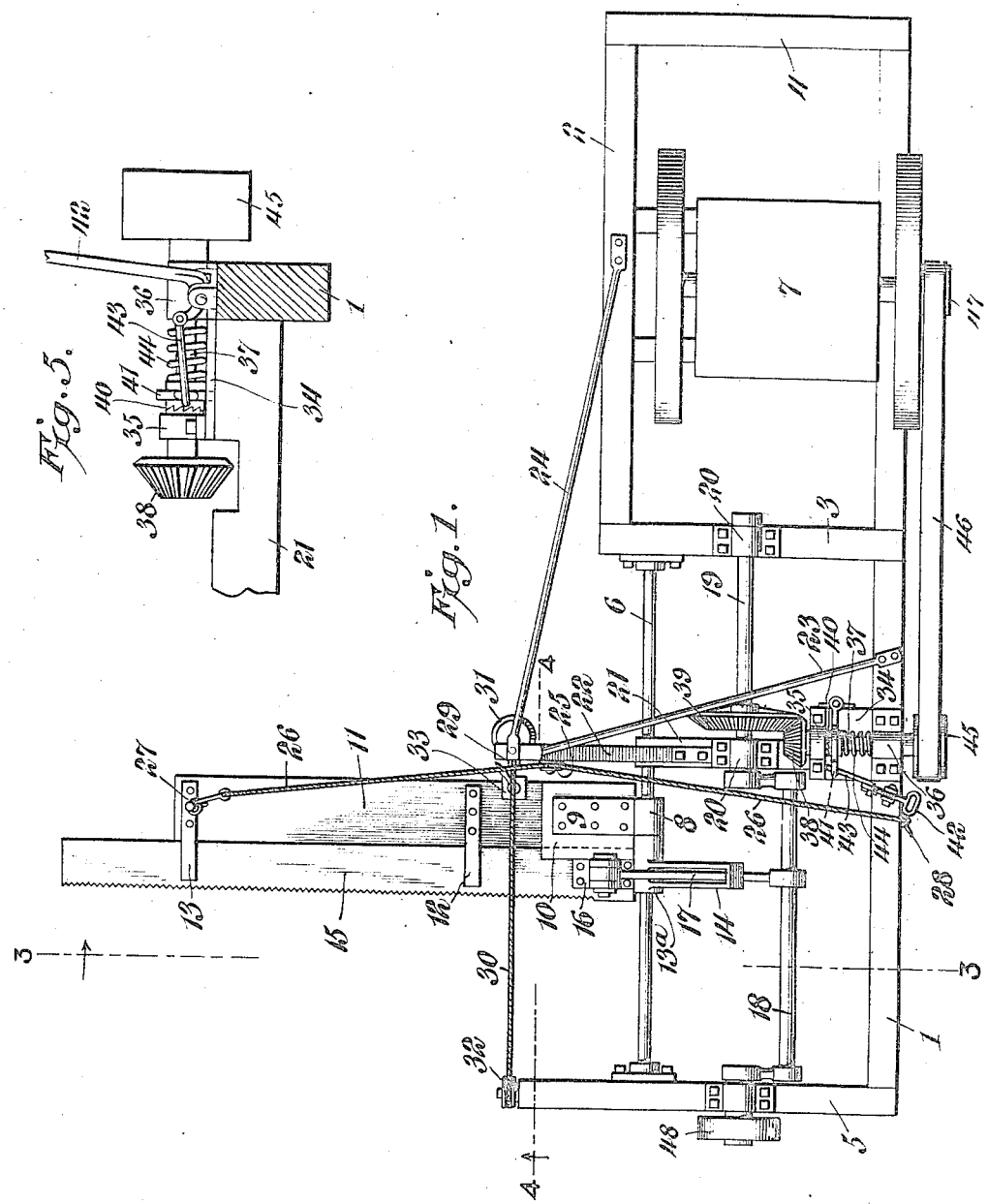

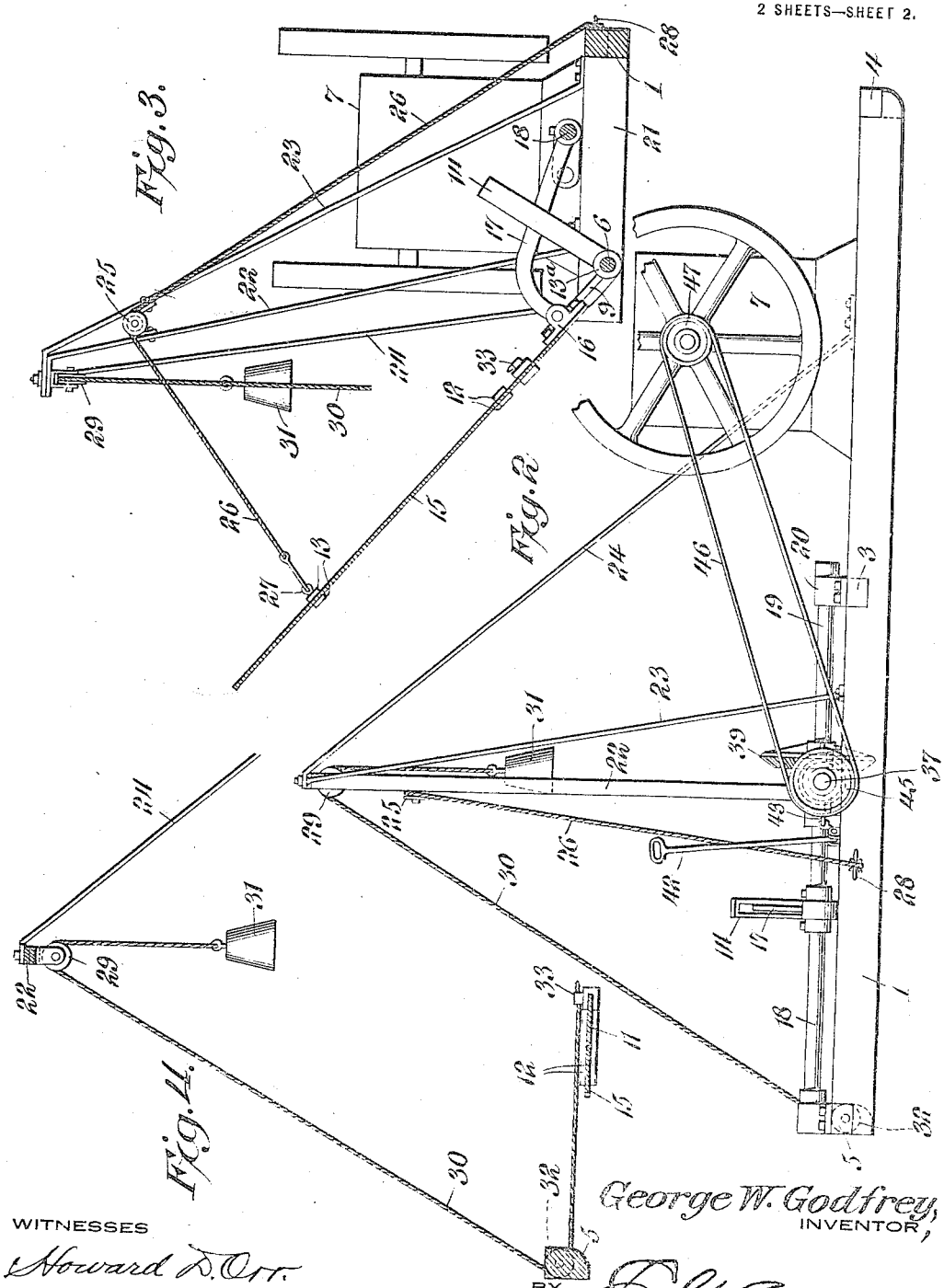

GEORGE W. GODFREY, OF WILLOWSPRINGS, WISCONSIN.

DRAG-SAW.

1,255,737.  Specification of Letters Patent.  Patented Feb. 5, 1918.

Application filed February 16, 1917. Serial No. 149,090.

*To all whom it may concern:*

Be it known that I, GEORGE W. GODFREY, a citizen of the United States, residing at Willowsprings, in the county of Lafayette and State of Wisconsin, have invented a new and useful Drag-Saw, of which the following is a specification.

This invention has reference to drag saws, and its object is to provide a power machine, capable of being transported from place to place, for clearing land of trees or stumps of any size level with the surface of the ground, so that the land is cleared of all obstructions permitting any kind of machinery to be used on the surface of the land.

The invention comprises a basic member which may be in the form of a drag capable of being drawn by draft animals and carrying a saw so mounted as to, in the operative position, lie close to the surface of the ground, said drag also having a power unit on it connected up to the saw for driving the latter. The saw is provided with means mounted on the drag to automatically feed it when in operation, and the saw is furthermore so mounted that it may be readily elevated into an out-of-the-way position when it is desired to transport the device from place to place.

Since explosion engines of suitable type are readily available, the power unit mounted on the drag may consist of such an engine.

By mounting the various parts of the device upon a basic structure utilizable as a drag the saw may be brought very close to the surface of the ground and the whole device may be readily transported from place to place by the use of draft animals.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a plan view of the land clearing device.

Fig. 2 is a side elevation thereof.

Fig. 3 is a section on the line 3—3 of Fig. 1, but omitting some distant parts, and showing the saw and its carrier in the elevated position.

Fig. 4 is a section on the line 4—4 of Fig. 1.

Fig. 5 is a detail of a clutch mechanism and part of the driving mechanism shown on a larger scale than the other figures.

Referring to the drawings, there is shown a skid formed of a long side timber 1, another shorter side timber 2 joined to and spaced from the timber 1 by cross timbers 3, 4, and another cross timber 5 at the end of the side timber 1 remote from the timbers 3 and 4. The timbers 3 and 5 are joined by a rod 6 connected to said timbers in spaced relation to and parallel with the timber 1. In the particular showing of the drawings the timber 5 is longer than the timber 3 and projects for a distance beyond the rod or bar 6 on the side thereof remote from the timber 1, thus making the corresponding end of the skid wider than the other end. This particular construction, however, is not obligatory, and the skid may be otherwise formed than described, its purpose being to serve as a basic member for purposes to be described.

Mounted on that portion of the skid or basic frame defined by the timbers 1, 2, 3 and 4 is an engine 7, which may be taken as indicative of any suitable type of explosion engine, or other power unit capable of developing sufficient power for the purposes of the invention.

Mounted on the rod or bar 6 to slide and turn thereon is a sleeve 8 with an extension 9 radially projecting therefrom, and in turn carrying a plate 10. The extension 9 is made fast to a flap strip 11 provided with pairs of fingers 12, 13, respectively, projecting from one long side of the strip 11, which latter is disposed radially with respect to the bar 6.

Fast to the plate 10 is another sleeve 13$^a$ also mounted on the bar 6 for rocking movements thereon with the sleeve 8. Projecting radially from the sleeve 13$^a$ in a direction remote from plate 10 is a guide frame 14 to which reference will hereinafter be made.

Carried by the strip 11 with its fingers 12 and 13 is a saw blade 15 having fast thereto at one end an ear bracket 16, to which is pivoted one end of a link 17 extending through the guide 14 and carried by a crank 18 forming part of a crank shaft 19. Journal bearings 20 are provided for the shaft 19 upon the timbers 3 and 5 and upon an intermediate timber 21 carried by the timber 1 and the bar 6 in the particular showing of the drawings, although it will be understood that such arrangement may be considerably varied, especially where it is desired to give a greater range of movement of certain parts.

Rising from the timber 21 is an upright 22 having connected to its upper end braces 23, 24 extending to the timbers 1 and 2, respectively, so that the upright 22 is rendered rigid and capable of sustaining considerable weight. At an appropriate point near the top of the upright 22 there is secured a sheave 25 over which there is passed a rope 26 fast at one end to an eye 27 on one of the fingers 13 and extending to the timber 1, where it may be secured to a pin 28 or other holding device. The purpose of the rope 26 is to maintain the saw and its carrying and guiding strip 11 in an elevated position, such, for instance, as indicated in Fig. 3.

Fast to the post 22 at its upper end is another sheave 29 over which there extends a rope 30 carrying a weight 31 at one end, and extending from the sheave 29 to another sheave 32 on one end of the timber 5 adjacent to the saw 15. After passing around the sheave 32 the rope 30 is extended to a clamp member 33 on the strip 11, to which clamp member the rope is fastened. The arrangement is such that the weight 31 tends to move the saw in the direction of cut, so that when the saw is placed into proper relation to a tree or stump, and is set in motion by means to be described, the saw is automatically fed through the tree or stump with the saw blade very close to or substantially upon the surface of the ground, thus leveling the tree or stump to the ground.

In order to drive the saw the timber 21 carries a plate 34 upon which are mounted spaced bearings 35, 36 for a countershaft 37. That end of the shaft 37 adjacent to the crank shaft 19 carries a bevel pinion 38 normally loose upon the shaft and meshing with a bevel gear wheel 39 fast to the crank shaft 19. Fast to the gear pinion 38 is one member of a clutch 40, the other member being mounted on the shaft 37, so as to rotate therewith, but be movable lengthwise thereof. A lever 41 pivoted to the plate 34, and engaging the movable clutch member is under the control of a manipulating lever 42 connected thereto by a link 43. A spring 44 on the shaft 37 tends to hold the clutch members in engagement while the clutch members may be moved out of engagement by the lever 42. The shaft 37 carries a pulley 45 connected by a belt 46 to another pulley 47 on the drive shaft of the engine 1.

In order to steady the action of the crank shaft 19 while imparting reciprocatory movements to the saw 15, a fly-wheel 48 is mounted on the crank shaft.

The device of the invention is moved into such relation to the tree or stump to be cut that the saw 15 on being lowered into substantial contact with the ground with the weight 31 elevated, has its toothed edge in such relation to the tree or stump that when the saw is reciprocated it will cut into and ultimately through the tree or stump. Now, with the engine 7 running, and with the clutch 40 out of engagement, the lever 42 is released, so that the spring 34 will move and hold the clutch in engagement. The engine being connected to the shaft 37 by the belt 46 and the pulleys 45 and 47, drives this shaft, and when the clutch is engaged the engine 7 drives the crank shaft 19 by way of the pinion 38 and gear wheel 39. This causes a reciprocatory movement of the saw 15, and as the saw cuts into the tree or stump, it is continuously fed by the weight 31 acting to move the sleeves 8 and 13, constituting the guiding devices for the saw, along the bar 6 in the proper direction. The action continues automatically until the stump has been cut off or the tree felled with the cut substantially level with the ground. The engine may then be stopped and the parts restored to the first position with the saw elevated, and then the device may be moved to another tree or stump and the operation repeated. In this way a large tract of land may be expeditiously cleared of standing timber whether in the form of stumps or trees.

The saw is constrained to cut promptly through the tree or stump because the rope 30 is connected to the saw carrying member 11 at a point which if applied to the saw would be between the ends thereof. In this manner the feeding device for the saw may be brought into very close relation to the tree or stump.

The strip 11 need be no thicker than the saw and the guide fingers 12 and 13 are separated lengthwise of the saw sufficiently to permit the saw to pass entirely through the tree or stump without interference. In the operative position of the parts the faces of the saw are practically parallel with the ground, or substantially horizontal, so that the movement of the saw in being fed to the work is in a plane parallel with the ground and therefore substantially horizontal.

What is claimed is:—

1. A drag saw comprising a skid movable from place to place over land to be cleared, a power unit mounted on the skid, an elongated guide bar on the skid, a reciprocable saw carried by the guide bar and movable therealong at right angles to the direction of reciprocation of the saw, a crank shaft on the skid elongated in the direction of the length of the guide bar, a pitman connected to the saw and movable lengthwise of the crank, and driving connections between the crank shaft and the power unit.

2. A drag saw comprising a support transportable from place to place over land to be cleared, an elongated guide bar on the support close to the ground engaging part thereof, a guiding carrier mounted on the guide bar and movable lengthwise thereof, a flat reciprocable saw blade mounted on the guiding carrier for movement therewith, said guiding carrier being of substantially the same thickness as the saw blade and in edge to edge engagement therewith and having sets of guide fingers embracing the saw and spaced apart lengthwise of the saw by a distance greater than the diameter of trees or stumps to be cut, means for reciprocating the saw blade, and elongated in the direction of the length of the guide bar for movement of the saw in the direction of the length of the guide bar perpendicular to its movements of reciprocation, and means for moving the guiding carrier and saw simultaneously in a direction to feed the saw through the material to be cut.

3. A drag saw comprising a reciprocable saw blade, a saw guide directly carrying the saw blade, an elongated guide bar on which the saw guide is mounted to slide lengthwise of the guide bar and also to swing thereon about the longitudinal axis thereof, and driving connections for the saw to drive the same as it slides and also in any position of adjustment of the saw in a vertical plane.

4. A drag saw for clearing land comprising a skid transportable from place to place over the land to be cleared, a power unit mounted on the skid, an elongated guide bar on the skid close to the ground engaging part of the skid, a reciprocable flat saw blade pivotally mounted on the guide bar and movable in an upright arc about the guide bar as an axis, a flat strip mounted on the guide bar to turn thereon with the saw and engaging the back edge of the saw, said strip having longitudinally spaced pairs of fingers embracing the saw in sufficiently spaced relation to be located on opposite sides of a tree or stump to be cut, the saw blade and backing strip being of substantially like gage, and means for connecting the power unit to the saw for reciprocating the latter.

5. A drag saw for clearing land comprising a skid transportable from place to place over the land to be cleared, a power unit mounted on the skid, an elongated guide bar on the skid close to the ground engaging part of the skid, a reciprocable flat saw blade pivotally mounted on the guide bar and movable in an upright arc about the guide bar as an axis, a flat strip mounted on the guide bar to turn thereon with the saw and engaging the back edge of the saw, said guide strip having longitudinal spaced pairs of fingers embracing the saw and in sufficiently spaced relation to be located on opposite sides of a tree or stump to be cut, the saw blade and backing strip being of substantially like gage, and means for connecting the power unit to the saw for reciprocating the latter, the skid being provided with an upright and a weighted strand carried by the upright and by the main portion of the skid and connected to the backing strip of the saw near the butt end of the latter to continually urge the saw laterally into an upright tree or stump being cut.

6. A drag saw for clearing land, comprising an elongated support, a power unit thereon, a reciprocable saw pivotally mounted on the support to move about its pivot in an upright plane, means for feeding the saw in the direction of the length of the frame, and at right angles to the reciprocable movement of the saw, and driving connection between the power unit and the saw including a crank and pitman, with the crank elongated in the direction of the feeding movement of the saw and the pitman slidable lengthwise of the crank in harmony with the feed of the saw.

In testimony, that I claim the foregoing as my own, I have hereto affixed my signature in the presence of two witnesses.

GEO. W. GODFREY.

Witnesses:
J. B. REYNOLDS,
W. J. TOMLIN.